July 20, 1926.
H. O. BROWN
ADVERTISING DEVICE
Filed Oct. 31, 1924
1,593,286
3 Sheets-Sheet 1
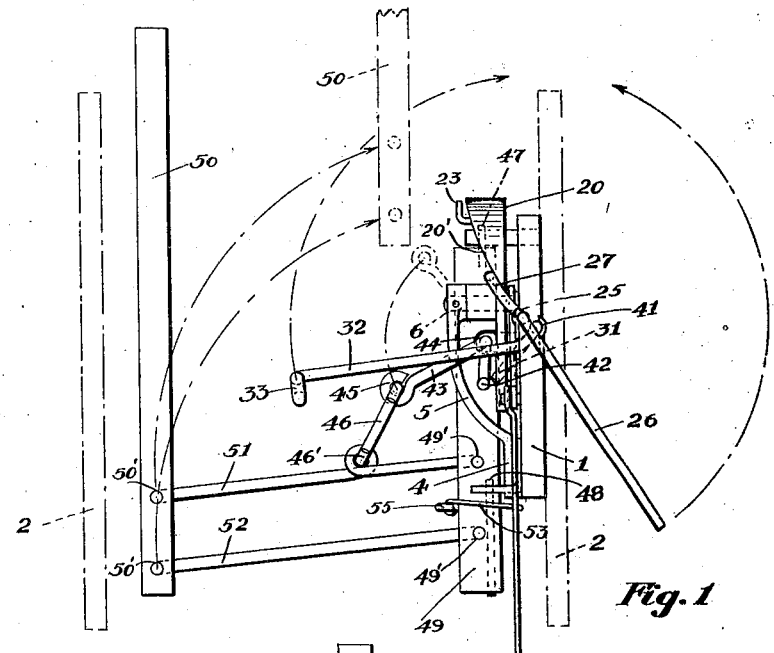
Fig. 1
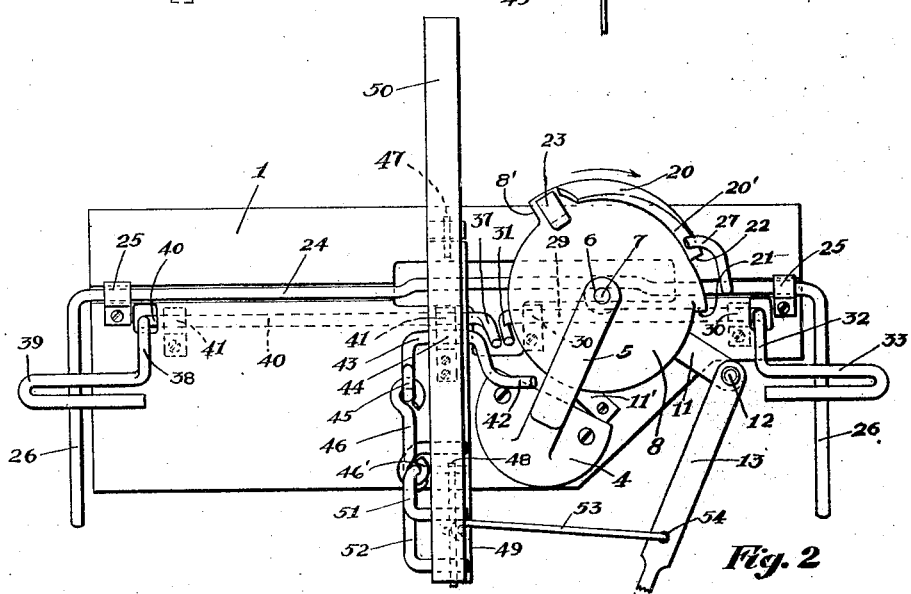
Fig. 2
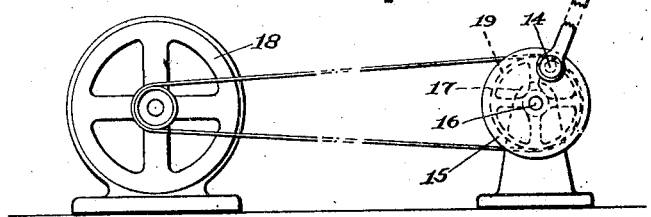
Inventor:
Herbert O. Brown
By
S. W. Bates
Attorney.

July 20, 1926.

H. O. BROWN

ADVERTISING DEVICE

Filed Oct. 31, 1924

Inventor:
Herbert O. Brown
By
J. W. Bates.
Atty.

Patented July 20, 1926.

1,593,286

UNITED STATES PATENT OFFICE.

HERBERT O. BROWN, OF FAIRFIELD, MAINE.

ADVERTISING DEVICE.

Application filed October 31, 1924. Serial No. 747,097.

My invention relates to an advertising device for use in store windows, and it is designed particularly for store window displays at Christmas time. The invention consists of mechanism for imparting motion to the figures which enact a pantomime setting forth Santa Claus and the children as they might be expected to perform at Christmas time.

The scene of the pantomime includes a chimney, Santa Claus on the inside and one or more children on the outside.

At the beginning the children are located on the shelf which represents the floor of a room and Santa is supposed to be at some point within the chimney.

The pantomime opens by the children climbing to the top of the chimney, peering down into it as if intent on finding Santa. At this point they are supposed to have seen Santa Claus inside and at once they drop back and down to their original position on the floor.

Immediately thereafter Santa Claus raises, first one of his hands to the top of the chimney, and then the other, and finally lifts his head so as to look out over the top of the chimney where he is supposed to see the children. While he is rising to this position a side to side movement is given to his head as though he was looking about, and when he catches sight of the children he at once falls to his lowest position within the chimney.

This little drama or pantomime is repeated over and over again in the store window, and is designed to call the public's attention to the fact that Christmas goods are on sale at the store.

The invention consists of the various mechanical parts for producing the various motions of Santa Claus and the children for the purpose of enacting mechanically the above described pantomime.

While I have chosen the figures representing the actors in the pantomime as appropriate for the Christmas season, it is obvious that any other combination of subjects,— such as a cat and mice, substituting therefor Santa and the children, respectively, may be employed in a mechanically operated advertising device of the nature of the one disclosed.

I have illustrated the mechanism used in my invention by the accompanying drawings, in which:—

Fig. 1 represents an end elevation of the actuating parts,

Fig. 2 is a side elevation of the same taken at right angles to that shown in Fig. 1.

Similar characters of reference refer to similar parts throughout all the different views of the drawings.

Figure 3:
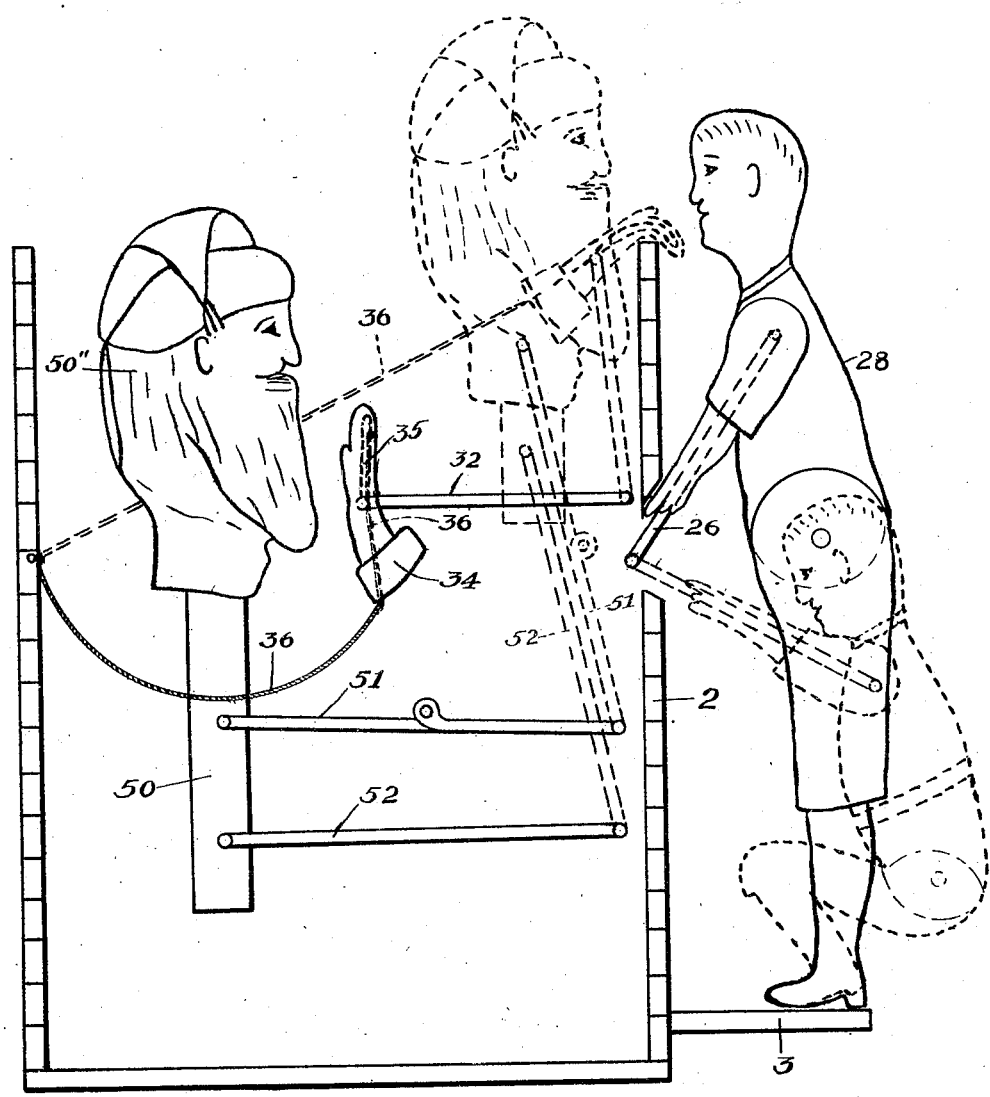
Fig. 3 shows an elevation somewhat similar to that shown in Fig. 1 but with the actors shown in different positions which they assume in the pantomime.
Figure 4:
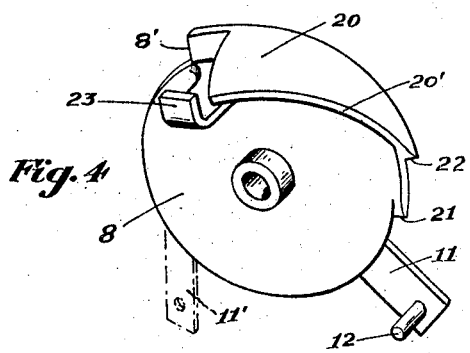
Fig. 4 shows a front view of the combined ratchet-wheel and operating cam.

I begin a description of the device, stating the mechanical function of each element entering into its construction, with the different movements, required to produce the desired results given in their proper sequence, I will take, as a starting point, the machine as it is portrayed in Figs. 1 and 2, showing all parts "at rest", or at the commencement of one complete cycle of actuation of the whole assembly, the only elements lacking in these two views being the character figures and these are illustrated in Fig. 3.

To combine the moving parts into a compact unit structure I secure a back-board 1 interiorly to the front wall of the member 2, representing the chimney, and attach thereto all the moving parts except the child figure which is partly mounted on the shelf 3 exteriorly of the front chimney or wall.

Secured to the board 1 is a plate 4, having an offset and extended portion 5, with a hole 6 therein. Fixed in this hole is a stud 7, rotating over which is a disc 8. This disc initiates and controls all the pantomimic actions of the character figures.

Figure 5:
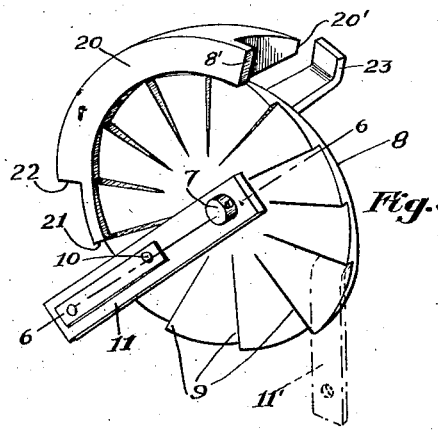
Fig. 5 is a rear view of the same, both being in perspective.
Figure 6:
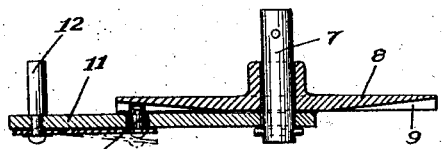
Fig. 6 is a cross sectional view taken on line 6—6 of Fig. 5.
Figure 7:
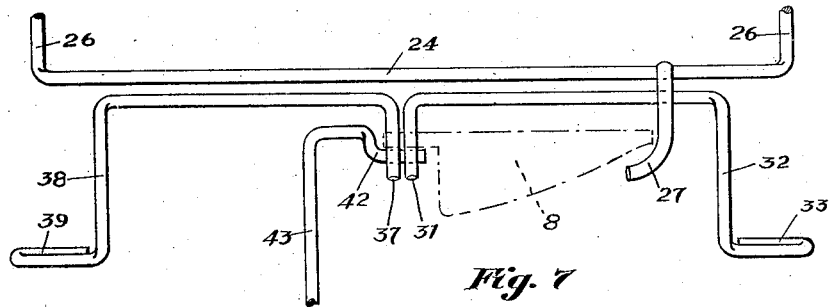
Fig. 7 is a view, in plan, showing the general arrangement of the rods and arms used in operating the device, and upon certain parts of which the figures or characters in the pantomime are mounted.

There is formed on the back side of this disc a series of ratchet teeth 9 (Fig. 5), upon which operates the pawl 10 yieldingly secured to the ratchet arm 11, one end of which is pivotally mounted on the stud 7 and has on its opposite end a stud 12. Mounted on the stud 12 is the oscillating end of a connecting-rod (see Fig. 2) having at its lower end connections with a crank-pin 14, by which it is driven. 15 is a crank-disc to which the crank-pin 14 is secured; it is mounted on the shaft 16, which runs in bearings 17. This crank may be actuated by any convenient prime motor, but I have illustrated the drive as consisting of an electric motor 18 with a belt from the same operating the pulley 19 mounted on the shaft 16.

It will be seen that the rotation of the crank-pin 14 will transmit an oscillatory movement to the pin 12, which through the pawl 11 and the ratchet teeth 9 will cause the disc 8 to rotate in a series of intermittent movements and will produce in the actor characters, as they are made to move a hesitating action.

A spring dog 11' engaging the teeth as the cam turns prevents the disc 8 returning or rotating backwardly, on the return stroke of the ratchet pawl.

Projecting outwardly from the side of the disc 8 is an arcuate section 20 having its right-angularly disposed face 20' formed into a cam surface at its edge and at 21 and 22 are projecting shoulders on the face of the disc and at 23 an outwardly extending upturned portion, the purpose of all of which will hereinafter be explained.

Referring to Fig. 3 the child figure is shown as having risen from the crouching or "at rest" position to the standing posture. This is the first in the series of pantomimic actions.

To obtain this movement of the child I extend horizontally across the board 1 a rod 24, (see Fig. 2) oscillating in bearings 25. At each end of this rod, and integral therewith, are right-angularly disposed portions 26, normally downwardly inclined, and at 27 (see Figs. 1 and 2) I secure an upturned arm to the said rod 24 and so placed as to be in the path of the cam portion 20' of the disc 8.

Secured to the portions 26 by their being thrust into one of the pivoted arms of each child, are character figures 28 representing children one in full and one in dotted line.

As illustrated the device carries two of these figures. By providing more of the arms 26 a greater number of children may be employed. The figures are jointed at the shoulders and hips and the feet are secured to the shelf 3.

As the disc 8 revolves, the cam portion 20' engages the arm 27 (Fig. 2) and slowly, and by intermittent movements brings the portions 26 into a raised or substantially upright position, and lifting the child figure from the crouching, to the erect position, as seen in Fig. 3. As the figures are secured to a rod 26 hung at and swinging from a central point the movement of the figure is a combination of vertical and horizontal actions. The child first appears to be afraid to rise and swings outwardly away from the chimney in which he expects to find Santa Claus, this movement being on the outward swing of the attaching point of the child on the rod; but presently he apparently gains courage and in continuing to rise from this point swings in on the arc nearer the chimney, until at the extreme upward position he is looking down into the same.

Taking this, together with the halting action in rising the child simulates the hesitating, expectant attitude displayed by the average human child when things pertaining to Santa Claus are under consideration.

The ratchet teeth are so spaced that the figure remains in the extreme up position for a space of time, but to still further carry out the illusion, the child, apparently again becoming afraid of something he sees within the chimney, is made to drop back suddenly to his original crouching position. This movement takes place when the arm 27 falls off from the part 23, (see Fig. 2) the function of which is to somewhat prolong the dwell of the arm 27 without extending the cam face 20' unduly.

The second part of the pantomime concerns the action of Santa Claus. On the rod 29, which is oscillatively mounted in bearings 30 is an outwardly extending arm 31, placed in the path of the projection 21, on the disc 8. On the opposite end of this rod 29 is an offset portion 32, normally resting in a substantially horizontal position and having on its outer end a bent over part formed into a hook 33. Sewed on, tied or otherwise secured to this hook is a representation of the human hand encased in a glove or mitten 34 (Fig. 3). Within this glove is a flat spring 35, the inner end being fastened to the wrist portion of the glove, or to the hook 33. To the outer end, or the end nearest to the tip of the fingers a cord 36 attaches to this spring, and extends out of the glove to be fixed on some part of the back wall of the chimney or other solid foundation.

As the projection 21 engages the arm 31 it swings the offset portion 32, upon which is mounted the glove over the hooked end, upwardly until the fingers of the glove lay flat upon the top of the chimney. Up to this point the swing of the arm 32 is not quite completed, but the cord 36 has become taut. A slight further movement forward, completing the swing of the arm 32, pushes the body of the glove forwardly, but the fingers, controlled by the cord-attached end of the flat spring, are caused to contract and assume a curved shape simulating the grasp by the human hand of the chimney top.

This operation is duplicated by substantially similar mechanism to operate the end of the other hand of Santa Claus.

Projections 22 engage the arm 37 having the offset portion 38 and the hooked end 39 integral with the rod 40, the latter oscillating in bearings 41.

During the upward swing of the hook 39, carrying the last mentioned glove, the rotation of the disc 8 brings the cam face 20' into engagement with the bent arm 42, the latter being a part of the rod 43 which oscillates in bearing 44, the whole terminating in an eye 45 which loosely connects with a link member 46.

Centrally of the machine, and oscillatively mounted on the back-board 1, on pivot pins 47 and 48 is a standard 49. Positioned some distance back toward the rear wall of the chimney is another standard 50. Connecting the two standards 49 and 50 are rods 51 and 52 (see Fig. 1) their ends being bent over at right angles to their length made to fit holes 49' and 50' in the standards 49 and 50 respectively.

On the lower end of the link 46 is an eye 46' swingingly connected to a similar eye formed on the rod 51. The holes 49'—49' and 50'—50' in the standards 49 and 50 respectively, are equally spaced, so that the rods 51 and 52 are parallel. When the bent arm 42 lifts the rod 43 through the engagement of the former with the cam face 20', as heretofore stated, it brings through the connecting parts, the standard 50 upward and forwardly toward the front of the chimney. On account of the parallelism of the rods 51 and 52 the standard will rise and always remain in a perpendicular position.

On the top of the standard 50 is mounted a representation of the head of Santa Claus 50'' and the movement which brings the latter from the lower to the high position is made during and subsequent to the lifting of the second hand. Both hands of Santa are held in position, grasping the chimney top, by the arms 31 and 37 contacting on the backside of the disc 8, or at the rear of the arcuate section 20. When the disc 8 revolves so that the arms 31, 37 and 42 fall off the end of the section 21 and 22 the three characters namely the head and two hands of Santa Claus mentioned will drop back to their original positions, and the whole mechanism, having completed one cycle of movement, will once more come to the "at rest" station.

To give a still further realistic effect to the actions of Santa Claus I provide means for oscillating the standards 49 and 50 about the pins 47 and 48. To accomplish this I connect a link-bar 53 one end of the connecting rod 13 at 54, and the other end to a screw eye 55 extending out from the rearward side of the standard 49. The oscillation of these standards will cause Santa to appear to be looking, first in one direction and then in the other, as if to discover the whereabouts of the children whom he is seeking.

In the foregoing I have described and illustrated but one of the possible embodiments of my invention, and I do not restrict myself to the absolute construction as herein set forth, but consider myself at liberty to employ any deviation from the design and detail of parts disclosed provided always that it shall come within the meaning and intent of my invention and of the appended claims.

I claim:—

1. In a window display for advertising, the combination of a construction representing a chimney or wall, a support secured thereto, an upright member adjacent thereto, a head of Santa Claus or the like thereon, a pair of parallel swinging rods pivoted to said upright member and to said support, a third swinging rod pivoted to said support, all of said swinging rods being substantially horizontal and terminating adjacent to the wall or chimney, said third swinging rod having secured at the end thereof a glove or mitten, a horizontal bar journaled in said support and connected with one of the parallel rods, a cam rotatably mounted on said support and having means for engaging said bar and said third swinging rod to cause the head of Santa Claus to rise above the level of the chimney or wall and said glove or mitten to be placed on the top of said wall and to return to their initial positions.

2. In a window display for advertising, the combination of a construction representing a chimney or wall, a support secured thereto, an upright member adjacent thereto, a head of Santa Claus or the like thereon, a pair of parallel swinging rods pivoted to said upright member and to said support, a third swinging rod pivoted to said support, all of said swinging rods being substantially horizontal and terminating adjacent to the wall or chimney, said third rod having secured to the end thereof, a substantially straight flexible spring, a glove or mitten secured to said spring, a flexible cord secured to the inner end of said spring, the other end thereof being secured to a permanent portion of said construction, a horizontal bar journaled in said support and connected with one of the parallel swinging rods, a cam rotatably mounted on said support and having means for engaging said horizontal bar and said third swinging rod to cause the head of Santa Claus to rise above the level of the chimney or wall and said glove or mitten to rest on the top of said wall and means permitting them to return to their initial positions.

3. A window display device comprising, in combination, a fixed upright wall, a shelf thereon, a rod journaled on said wall having an offset portion, a figure representing a child crouched on said shelf with its arms engaging said offset portion; and a cam having means engaging said rod to cause its oscillation whereby the figure is raised from its crouched position to a standing position and returned to its crouched position.

4. A window display device for advertising, the combination of a construction representing a wall or chimney, a support secured thereto, an upright adjacent thereto, a figure as of Santa Claus secured to said upright, a pair of horizontal bars pivoted to said upright and to said support, a third bar pivoted to said support and having on its outer end a glove or mitten, a horizontal rod journaled in said support and secured to one of said pair of bars, a cam for rotating said horizontal rod and said third bar to raise the head and figure of Santa Claus above the edge of the chimney and to place said mitten or glove in contact therewith and means for allowing the part to fall to their initial position, the figure of a child adjacent to said chimney and on the other side from Santa Claus, a horizontal rod journaled in said support and having an arm projecting therefrom, the said figure of the child secured to said arm, means on said cam for rotating said rod to elevate said figure so that its head comes above the wall or chimney and means for releasing the parts to cause them to fall to their lower position, the releasing mechanism adapted to allow Santa Claus to fall to its lower position alternately with the fall of the figure of the child to its lower position whereby first Santa Claus and then the child will peer over the top of the wall or chimney and then dodge back to their lower positions.

5. In a window display for advertising, the combination of a construction representing a chimney or wall, a support secured thereto, an upright member adjacent thereto, a head of Santa Claus or the like thereon, a pair of parallel swinging rods pivoted to said upright member and to said support, a third swinging rod pivoted to said support, all of said swinging rods being substantially horizontal and terminating adjacent to the wall or chimney, said third swinging rod having secured at the end thereof, a glove or mitten, a horizontal bar journalled in said support and connected to one of the parallel swinging rods, a cam rotatably mounted on said support for rotating said horizontal bar and said third swinging rod to cause the head of Santa Claus to raise above the level of the chimney or wall and said glove or mitten to be placed on the top of said wall and means for suddenly allowing said swinging rods to fall to their lower positions and means for causing said upright to turn from side to side while rising.

6. In a window display for advertising, the combination of a construction representing a chimney or wall, a fixed support secured thereto, a rotatable support mounted on said fixed support, an upright member adjacent thereto, a head of Santa Claus or the like thereon, a pair of parallel swinging rods pivoted to said upright member and to said rotatable support, a third swinging rod pivoted to said fixed support, all of said swinging rods being substantially horizontal and terminating adjacent to the wall or chimney, said third swinging rod having secured at the end thereof a glove or mitten, a horizontal bar journaled in said fixed support and connected with one of said parallel swinging rods, a cam rotatably mounted on said fixed support for rotating said horizontal bar and said third swinging rod to cause the head of Santa Claus to rise above the level of the chimney or wall and said glove or mitten to be placed on the top of said wall and means for suddenly allowing said swinging rods to fall to their lower positions, an electric motor, oscillating mechanism connected thereto and to the cam, a connecting rod connecting said oscillating mechanism with said rotatable support for turning the head of Santa Claus from side to side.

7. A display device comprising, in combination, a fixed upright wall, a figure representing a crouched child mounted on one side of the wall, a figure representing Santa Claus mounted on the other side of said wall, rods mounted on said wall having engagement with said figures and with a cam, and said cam having means for engaging said rods to alternately raise said figures to the top of the wall; the said means being adapted to raise one figure while the other figure is permitted to remain below the top of the wall.

8. A display device comprising, in combination, a fixed upright wall, a figure representing a mittened hand mounted movably on one side of the wall; means for moving said hand to the top of the wall; and means for moving said hand to represent gripping said wall.

9. A display device comprising, in combination a fixed upright wall, a figure representing a head mounted movably on one side of the wall; means for moving said head to the top of the wall; and means having operative connection with the last said means for rocking the figure sidewise while so moving.

HERBERT O. BROWN.